United States Patent [19]

King

[11] Patent Number: 4,858,565

[45] Date of Patent: Aug. 22, 1989

[54] ENGINE COMPONENT HEATING AND COOLING ASSEMBLY

[75] Inventor: James A. King, Schofield, Wis.

[73] Assignee: J. I. Case Company, Racine, Wis.

[21] Appl. No.: 217,194

[22] Filed: Jul. 11, 1988

[51] Int. Cl.$^4$ .............................................. F22B 27/00
[52] U.S. Cl. .............................. 123/41.31; 123/41.49; 123/41.65; 123/198 E
[58] Field of Search ............... 123/41.01, 41.31, 41.48, 123/41.49, 41.56, 41.58, 41.62, 41.65, 41.66, 41.7, 198 E; 165/42, 44

[56] References Cited

U.S. PATENT DOCUMENTS 1,803,952  5/1931  Upton et al. ...................... 123/41.31
2,784,244  3/1957  Hines ................................ 123/41.31

Primary Examiner—Noah P. Kamen
Attorney, Agent, or Firm—Dykema Gossett

[57] ABSTRACT

A heating and cooling assembly in association with an internal combustion engine for minimizing the effect of temperature extremes on engine components. The assembly includes an enclosure which is located beneath or near the radiator such that the radiator traverses and divides the enclosure for forming air flow channels into the enclosure. The movement of air through the radiator passes across the channel openings and into the enclosure for creating a slight differential pressure which enhances the flow of air through the enclosure. Valves or baffles are provided such that the assembly may be switched from summer to winter operation.

3 Claims, 1 Drawing Sheet

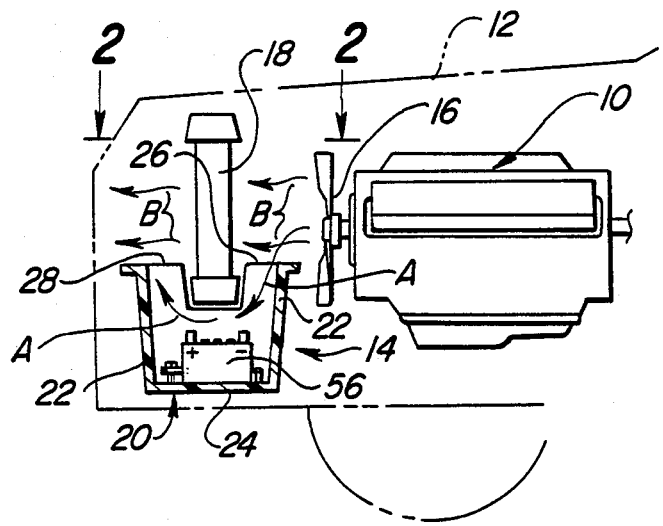
*Fig-1*
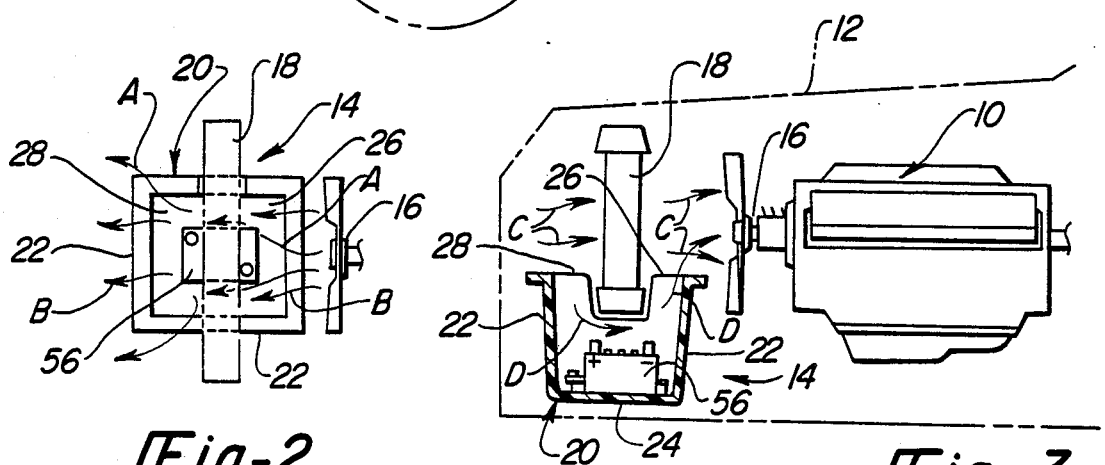
*Fig-2*  *Fig-3*
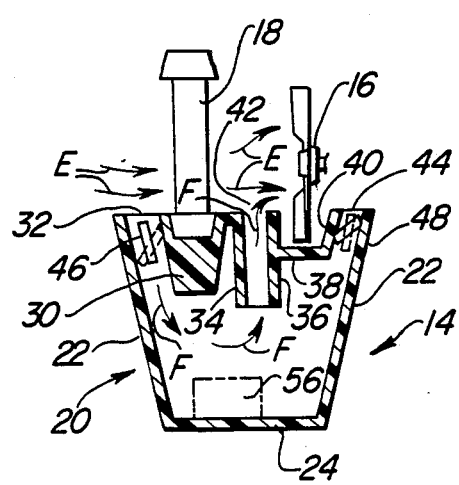
*Fig-4*
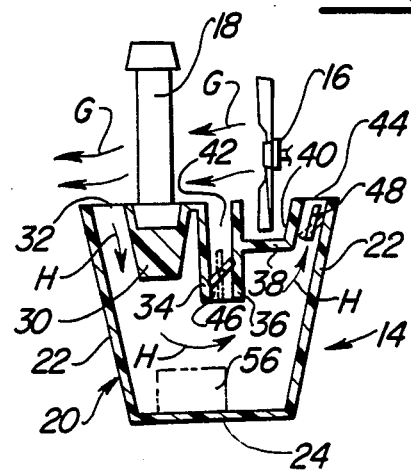
*Fig-5*

ENGINE COMPONENT HEATING AND COOLING ASSEMBLY

BACKGROUND OF THE INVENTION

The present invention relates generally to an assembly for providing heating or cooling to components which are normally mounted within an engine compartment.

In known internal combustion engines for vehicular, agricultural, industrial and construction equipment, there are components mounted within the engine compartment that are subjected to extremes in temperature. These components, such as batteries, ether injection bottles, and electronics, operate more reliably if the temperature extremes are reduced. One approach for reducing the temperature extremes has been to thermally insulate the engine compartment. Another approach has been to utilize air flow guides or air lines whose discharge is directed against the part to be cooled. Examples of the latter approach are shown in U.S. Pat. Nos. 4,071,009 and 4,226,217.

Thus, it is an object of the present invention to provide an assembly for an internal combustion engine of the type and construction described hereinabove which provides both heating and cooling to engine component parts that may be affected by temperature extremes. Further, it is an object of the present invention to provide an assembly that is an improvement over the constructions described hereinabove. Moreover, it is an object of this invention to provide an economical and non-complex assembly which produces an efficient air flow for both heating and cooling engine component parts.

SUMMARY OF THE INVENTION

The heating and cooling assembly for engine component parts is disclosed herein in association with a water-cooled internal combustion engine that is mounted on a vehicle within an engine compartment or enclosure. A fan assembly is suitably mounted on the engine for exhausting or pulling in an ambient air flow through a radiator. As is conventional, the radiator is adapted to circulate water or other suitable coolant therethrough for engine cooling purposes.

The assembly of the present invention includes a thermally insulated enclosure which is located beneath or near the radiator, having vertically disposed side walls and a bottom wall for supporting an engine component such as a battery. The radiator traverses and divides the enclosure such that air flow is directed or channeled through the enclosure below or near the radiator. Thus, the radiator and the enclosure define a generally U-shaped air flow passage for heating or cooling engine component parts, such as a battery.

The air flow is directed through the core of the radiator across the openings to the enclosure on the opposite sides of the radiator. This results in a slight differential pressure across the openings which enhances the flow of air through the enclosure, thereby aiding in efficient air flow. The assembly disclosed herein may be used for cooling engine components during the summer or heating the engine components during the winter.

The present assembly may also be constructed to provide for both summer and winter operation. An additional opening is added to the enclosure between the radiator and fan assembly. Further, thermostatically operated valves or baffles are provided within the enclosure openings to permit switching from summer to winter operation. As before, the movement of air through the core of the radiator passes across the enclosure openings to create a differential pressure to aid the flow through the enclosure, thereby heating or cooling the engine component.

Other advantages and meritorious features of the present assembly will be more fully understood from the following description of the invention, the appended claims, and the drawings, a brief description of which follows.

BRIEF DESCRIPTION OF DRAWINGS

FIG. 1 is a side elevational view, partly in cross-section, of the air flow directing assembly of the present invention in association with an internal combustion engine having a blower fan assembly.

FIG. 2 is a partial top plan view of the assembly illustrated in FIG. 1.

FIG. 3 is a side elevational view, partly in cross-section, of the assembly of the present invention in association with an internal combustion engine having a sucker fan assembly.

FIG. 4 is a side elevational view, partly in cross-section, of the air flow directing assembly which combines both summer and winter operation in association with a sucker fan assembly.

FIG. 5 is a side elevational view, partly in cross-section, of the air flow directing assembly which combines summer and winter operation in association with a blower fan assembly.

DETAILED DESCRIPTION OF THE INVENTION

FIGS. 1-5 illustrate a water-cooled internal combustion engine 10 within an engine compartment 12. The engine compartment is mounted on a conventional vehicle in substantial surrounding relationship relative to the engine 10. A heating and cooling assembly 14 made in accordance with the present invention is provided in association with engine 10 for providing a path for circulating ambient air. Further, a fan assembly 16 is suitably mounted to engine 10 to be driven thereby for aiding in the exhausting of an ambient air flow through a radiator 18 (FIGS. 1, 2 and 5) or for aiding in the pulling in of an ambient air flow through radiator 18 (FIGS. 3 and 4).

As is conventional, the radiator 18 is adapted to circulate water or other suitable coolant therethrough for engine cooling purposes. Further, fan assembly 16 is either of the blower or sucker type, as is well-known in the art. Moreover, the front end of compartment 12 includes a grill or the like (not shown) to permit ambient air to enter or exit compartment 12. The remaining components of engine 10, which is preferably of the diesel type, are conventional, and therefore, further explanation thereof is unnecessary for an understanding of the invention.

The heating and cooling assembly 14 of the present invention includes an enclosure 20 which is located beneath or near radiator 18. Enclosure 20 is a thermal barrier and includes vertically disposed side walls 22 and a bottom wall 24 for supporting an engine component such as a battery 26. Radiator 18 traverses and divides enclosure 20 such that air flow is directed or channeled through enclosure 20 between openings 26 and 28. That is, as illustrated in FIGS. 1-2, air flow is directed through radiator 18 and also into the opening or channel 26 that is formed between radiator 18 and the side walls 22 of enclosure 20. The ambient air is directed into channel or opening 26 when the blower fan assembly (FIG. 1) is used whereas air is directed through channel or opening 28 when the sucker fan assembly 16 (FIG. 3) is used. Thus, radiator 18 and the side walls 22 of enclosure 20 define a generally U-shaped air flow passage for heating or cooling engine components, such as battery 56, as will now be described in more detail.

Referring now to FIGS. 1-2, the air flow through enclosure 20 is indicated by arrows A and the air flowing through radiator 18 is indicated by arrows B. The movement of air through the core of radiator 18 passes across the openings 26 and 28 on the opposite sides of the radiator. This results in a slight differential pressure across openings 26 and 28 which enhances the flow of air through enclosure 20 in the direction of arrows A to aid in efficient air flow.

The arrangement illustrated in FIGS. 1-2 is preferably used for cooling components, such as battery 56, during summer operation. Relatively cooler air is blown through radiator 18 with the movement of air across openings 26 and 28 generating a differential pressure which will cause the flow of air through enclosure 20 and around battery 56.

FIG. 3 illustrates an arrangement wherein air is drawn into engine compartment 12 and through radiator 18 for summer operation. Air flow through radiator 18 is indicated by arrows C and air flow through enclosure 20 is indicated by arrows D. As described previously, the movement of air through the core of radiator 18 passes across the openings 28 and 26 to create a differential pressure to aid in the movement of the relatively cooler air flow through enclosure 20.

FIGS. 4 and 5 illustrate arrangements which combine both summer and winter operation. As previously described, the side walls 22 of enclosure 20 are joined by bottom wall 24, which supports battery 56. Radiator 18 is mounted on a solid traversing support 30 for forming a channel opening 32 on one side thereof. Further, traversing walls 34, 36, 38 and 40 are provided to form channel openings 42 and 44 on opposite sides of fan 16. Moreover, conventional thermostatically operated valves or baffles 46 and 48 are provided to permit switching from summer to winter operation.

In FIG. 4, the thermostatically operated valves 46 and 48 are mounted within channel openings 32 and 44 while in FIG. 5, valves 46 and 48 are mounted within channel openings 42 and 44. The operation of the arrangements shown in FIGS. 4 and 5 will now be described.

Referring now to FIG. 4, the air flowing through radiator 18 is indicated by arrows E and the air flowing through enclosure 20 is indicated by arrows F. For summer operation, thermostatically operated valve or baffle 46 is open and valve 48 is closed, as shown. Relatively cooler air is drawn through radiator 18 by sucker fan assembly 16 in the direction of arrows E. The movement of this air through the core of radiator 18 passes across channel openings 32 and 42 on the opposite sides of radiator 18. This results in a slight differential pressure across openings 32 and 42 which aids in efficient air flow, as previously described. Further, relatively warmer air flow is not permitted into enclosure 20 because valve 48 is closed. During winter operation, valve 46 is closed and valve 48 is opened. The relatively warmer ambient air within the engine compartment 12 is directed through channel opening 44 into enclosure 20 for exhaust through channel opening 42. The relatively cooler ambient air on the outside of radiator 18 cannot enter enclosure 20 because valve 46 is closed.

FIG. 5 illustrates a combined summer and winter operation using a blower fan assembly 16. The air flowing through radiator 18 is indicated by arrows G while the air flow through enclosure 20 is indicated by arrows H. FIG. 5 illustrates the arrangement for assembly 14 during winter operation. Air flow passes through the core of radiator 18 across the openings 32 and 44. Since valve 46 is closed and valve 48 is open, relatively warmer ambient air enters enclosure 20 through channel opening 32 and exits enclosure 20 through channel opening 44. During summer operation, valve 48 is closed and valve 46 is opened. This permits the relatively cooler air flow to be directed into enclosure 20 through channel opening 42. The air flow then is exhausted through open channel opening 32. Thus, as described, relatively warm or cooler air flow may be directed across an engine component, such as battery 56, to minimize the effect of temperature extremes on that component.

It will be apparent to those skilled in the art that the foregoing disclosure is exemplary in nature with the invention being defined by the appended claims.

I claim:

1. An internal combustion engine mounted within a compartment, said engine having a fan assembly, and a radiator mounted within said compartment in proximity with said fan assembly, wherein the improvement comprising:

an air flow directing assembly, said air flow assembly including an enclosure located adjacent said radiator, said enclosure having side walls and a bottom wall for supporting an engine component, said enclosure including first and second openings which are formed on opposite sides of said radiator, and said fan assembly directing air flow through said radiator and across said openings such that air flows through said enclosure for heating or cooling said engine component.

2. In the construction as defined in claim 1 wherein said radiator traverses and divides said enclosure such that air flow is channeled through the enclosure below or near said radiator in a generally U-shaped air flow path.

3. In the construction as defined in claim 2 wherein said enclosure includes a third opening, and valve means for directing air flow between two of said openings for selectively permitting heating or cooling of said engine component.

* * * * *